United States Patent Office

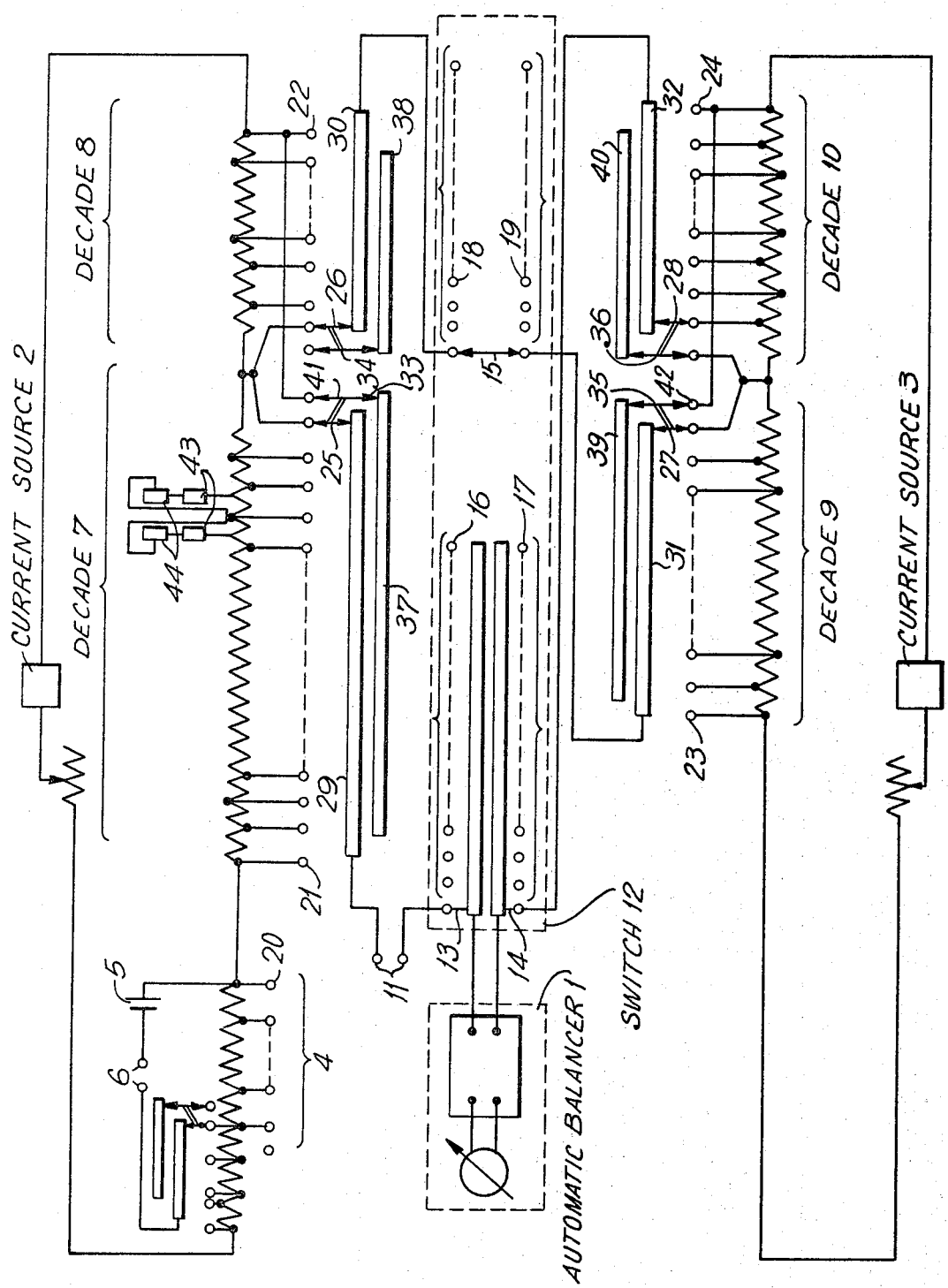

3,419,906
Patented Dec. 31, 1968

3,419,906
POTENTIOMETER HAVING A MULTIPOSITION
COMMUTATING DEVICE
Victor Sergeevich Umantsev, Krasnodar, U.S.S.R., assignor to Zavod Elektroizmeriteljnykh Priborov, Krasnodar, U.S.S.R.
Continuation of application Ser. No. 370,602, May 27, 1964. This application June 12, 1967, Ser. No. 645,550
1 Claim. (Cl. 324—98)

ABSTRACT OF THE DISCLOSURE

A potentiometer having at least two circuits adapted to have independent supply sources, each circuit having means for adjusting the value of the current in that circuit and balancing resistors in the form of decades, portions of these decade balancing resistors being adapted to be selected as required to provide a selected voltage which approximately balances the voltage across the unknown resistor to be measured, a self-balancing meter to measure the difference between the selected voltage and the voltage across the unknown resistor, one of the circuits having a standard resistor and switch means capable of applying successively the voltage across each stage of a first decade balancing resistor of one circuit against a constant voltage supplied by selected stages of the decade balancing resistors of the other circuit, so that any differences in the voltages across different stages of the first decade resistor are indicated on the self balancing meter.

---

This application is a continuation of application Ser. No. 370,602, filed May 27, 1964, now abandoned.

The present invention relates to electric instruments and to methods of checking high accuracy potentiometers employed for measuring voltages.

Known high accuracy potentiometers are designed so that for their checking it is necessary to use still more accurate and expensive potentiometers or other standard instruments.

The checking instrument errors limit the accuracy of potentiometer checking. The methods used for decreasing the negative effect of these errors considerably complicate the checking. To check the known high accuracy potentiometers it is necessary to compose and adjust multi-element checking circuits and to carry out time-consuming measurements.

Another disadvantage of the known potentiometers is that they are not provided with devices which permit decreasing the errors determined during checking by a simple and convenient method. This leads to a considerable increase of time required for calculating the corrections for potentiometers. All prior attempts to eliminate these drawbacks have not been successful.

An object of the present invention is to provide an improved potentiometer which will permit effecting its autonomous checking with practically any degree of accuracy required without employing standard and testing instruments.

A further object of the invention is to provide for the possibility of decreasing the detected errors by a simple and convenient method at the operating site.

Another object of the invention is to increase the accuracy of potentiometers and to provide quick automatic measurements necessary for checking with the highest accuracy.

The potentiometer according to the invention comprises an automatic balancer and at least two electrical circuits fed from independent supply current sources. Each of said independent electrical circuits includes measuring resistors with commutating devices for balancing the voltage to be measured, and adjustable resistors for adjusting and checking a working current according to a standard cell.

The potentiometer is also provided with a multiposition commutating device. When measuring an unknown voltage, this device combines the voltages taken from the measuring resistors of the independently fed circuits with such a polarity that they are summed up when balancing the unknown voltage; an automatic balancer balances and measures the difference between the unknown voltage and the voltage set at the measuring resistors of the potentiometer.

For checking the potentiometer, the aforementioned multichannel commutating device combines the voltages taken from the circuits of independent supply current with a reversed polarity. The automatic balancer automatically balances and measures the difference of the above-mentioned voltages. To check the potentiometer, the differences between the voltage at each stage of the minor decade and that of its first stage, the differences between the impedance of ten stages of the minor decade and that of one stage of the next stage of the senior decade, etc., are measured in succession. For all the decades, the difference between the voltage at the adjustable resistor and that of the measuring resistors corresponding to it according to the rated voltage are also measured.

Said voltage differences allow a determination of the potentiometer errors without employing any additional testing instruments and adjusting the resistors for decreasing these errors.

Other objects and advantages of the present invention will be apparent from the following description and the accompanying drawing in which a schematic diagram of the potentiometer is illustrated.

The potentiometer comprises an automatic balancer 1 and circuits with independent supply current sources 2 and 3. The circuit fed by supply current source 2 includes adjustable resistor 4 used to control the working current according to standard cell 5 by means of automatic balancer 1 or an indicator (not shown in the drawing) which is connected to contacts 6. Decades 7 and 8 of measuring resistors are connected into the same circuit.

The current fed by supply current source 3 includes an adjustable resistor (not shown in the drawing) and decades 9 and 10 of measuring resistors. Decades 7, 8, 9 and 10 serve for balancing the voltage to be measured which is applied to contacts 11.

Autonomous checking multiposition switch 12 is provided with brushes 13, 14 and 15 simultaneously moved along the rows of contacts 16, 17, 18 and 19. The adjustable resistor 4 is provided with taps 20 dividing it into sections the rated voltages of which are equal to the voltages at the stages of decades 7 and 8.

Decades 7, 8, 9 and 10 are provided with taps with contacts 21, 22, 23 and 24. Along these contacts, working brushes 25, 26, 27 and 28 of the decade switches are moved connecting the contacts of decades 7, 8, 9 and 10 with contact rings 29, 30, 31, and 32.

The decade switches are also provided with additional checking brushes 33, 34, 35 and 36 mechanically coupled with working brushes 25, 26, 27 and 28 and being placed at one step from them. Said checking brushes connect contacts 21, 22, 23 and 24 with contact rings 37, 38, 39 and 40.

In the rows of contacts 21 and 23 of decades 7 and 9 additional contacts 41 and 42 are mounted, connected to the final points in the rows of contacts 22 and 24 of the next minor decades 8 and 10. Contacts 41 and 42 are placed at a distance of one step from the zero contacts of decades 7 and 9.

The measuring resistors of decades 7, 8, 9 and 10 and the sections of adjusting resistor 4 are shunted with fixed additional resistors 43, the values of which exceed those of the shunted resistors, and with variable adjusting resistors 44 connected in series with fixed resistors 43.

When measuring an unknown voltage, applied to the contacts 11, autonomous checking switch 12 is set to the extreme left position, brushes 13, 14, 15 being set to the position shown in the drawing. The balancing voltages which are set by means of decades 7, 8, 9 and 10 are summed up and switched through automatic balancer 1 in opposition to the voltage to be measured.

Autonomous checking of the potentiometer is carried out in the following way:

First, the working currents of the supply current sources are adjusted according to standard cell 5. Then the difference between the voltage at one step of the decade 10 and that of each of the following steps of the same decade is measured. To accomplish this, the autonomous checking switch 12 is set to the position adapted for measuring said voltage difference. When switch 12 is set to this position, its brushes 14 and 15 are placed on the contacts of rows 17 and 18 connected by leads (not shown in the drawing) with contact rings 40 and 32 of the switch of decade 10. At the same position of switch 12, its brushes 13 and 15 are placed on the contacts of the rows 16 and 18 whereto the voltage is applied from the circuit section of supply current source 2 by leads (not shown in the drawing). This voltage has a polarity opposite to the voltage taken from the stages of decade 10. The voltage difference is measured by automatic balancer 1 which is always connected between brushes 13 and 14. By adjusting the current in the circuit of supply current source 3, the zero readings of automatic balancer 1 are obtained at one of the positions of decade switch 10. Then, without changing the currents in the circuits of supply sources 2 and 3, each step of this decade is switched on, in turn, by the switch of decade 10 and the difference is measured between the voltage of each stage of decade 10 and that of the stage at which the current adjustment has been carried out.

In the same way, the differences between the voltage at one of the stages of decade 9 and those of each of its other stages is measured by means of switch 9 with the autonomous checking switch 12 set to the corresponding position. Then the differences between the total voltage of the ten stages of decade 10 and the voltage of one stage of the next senior decade 9 is measured with the switch of decade 9 set to the zero position.

After this the differences between the voltages of all decades of the potentiometer are measured in the same sequence, as well as the differences between the voltages of the adjusting resistor 4 and the voltages at the resistors of the measuring decades, corresponding to the rated values.

Using the results of this autonomous checking, it is possible to adjust the potentiometer. To do this, the voltage differences measured during the checking are brought to the minimum by adjusting variable trimming resistors 44.

Automatic balancer 1 is checked by comparing it with the voltages at the measuring decades; if necessary, a trimming of the resistors in the automatic balance circuit is carried out by adjusting resistors (not shown in the drawing) and a second, more accurate checking and adjusting of the voltages at all the potentiometer resistors is made.

The results of this autonomous checking can be used not only for trimming the potentiometer for decreasing its errors, but for determining more accurate corrections for its readings.

For a better understanding of the invention, some equations for calculating the potentiometer corrections by using the voltage differences are derived below and a corresponding example is given.

Use is made of the following designations:

$Um,i$ is the real value of the voltage at stage $i$ of decade $m$, where $m$ is a serial number of the decade beginning from the senior one;

$Um,i_{nom}$ is the nominal value of the voltage at stage $i$ of decade $m$;

$\Delta_{m,i}$ is the correction of stage $i$ of decade $m$;

$dm,i$ is the excess of the real value of the voltage at stage $i$ of decade $m$ relative to the real voltage at the first stage of the same decade.

According to the definition we obtain:

$$dm,i = Um,i - Um,l \quad (1)$$

$$\Delta m,i = Um,i - Um,i_{nom} \quad (2)$$

Taking into account that the nominal voltage values of all the stages of the same decade are equal to one another, and, therefore $$Um,i_{nom} = Um,l_{nom}$$

we obtain $$\Delta m,i = Um,i - Um,i_{nom} = Um,i - Um,l_{nom}$$
$$= (Um,i - Um,l) + (Um,l - Um,l_{nom}) = dm,i + \Delta m,l \quad (3)$$

or $$\Delta m,i = dm,i + \Delta m,l$$

i.e. the correction of stage $i$ of decade $m$ is equal to the excess of the real value of the voltage at stage $i$ relative to the real voltage value of the first stage plus the correction of the first stage of the same decade.

Use is next made of the following designations:

$Um,1-10$ is the real value of the sum of the voltages at the ten stages of decade $m$;

$Um,1-10_{nom}$ is the nominal value of the sum voltage at the ten stages of decade $m$;

$\Delta m,1-10$ is the correction of the sum voltage at the ten stages of decade $m$;

$dm,1-10$ is the excess of the real value of the sum voltage at the ten stages of decade 10 relative to the real value of the voltage $Um-1,1_{nom}$ at the first stage of the senior decade $(m-1)$.

According to the definition we obtain $$dm,1-10 = Um,1-10 - Um-1,1 \quad (4)$$

$$\Delta m,1-10 = Um,1-10 - Um,1-10_{nom} \quad (5)$$

The nominal value of the sum voltage at the ten stages of the minor decade $m$ of the potentiometer is equal to the nominal value of the voltage $Um-1,1_{nom}$ at one stage of the senior decade $(m-1)$;

$$Um,1-10_{nom} = Um-1,1_{nom} \quad (6)$$

From Eq. 4 we find $$Um,1-10 = dm,1-10 + Um-1,1$$

By introducing the results into Eq. 5 we obtain $$\Delta m,1-10 = dm,1-10 + Um-1,1 - Um,1-10_{nom}$$

Taking into account Eq. 6 we obtain $$\Delta m,1-10 = dm,1-10 + Um-1,1 - Um-1,1_{nom}$$

As $$Um-1,1 - Um-1,1_{nom} = \Delta m-1,1$$

then $$\Delta m,1-10 = dm,1-10 + \Delta m-1,1 \quad (7)$$

On the other hand the correction of the decade sum voltage is equal to the sum of corrections of separate stages of this decade:

$$\Delta m, 1-10 = \sum_{i=1}^{10} \Delta m, i \quad (8)$$

By introducing the value $\Delta m,i$ from Eq. 3 into Eq. 8, we obtain $$\Delta m, 1-10 = 10 \Delta m, 1 + \sum_{i=1}^{10} dm, i \quad (9)$$

Solving Eq. 9 relative to $\Delta m,1$, we obtain $$\Delta m, 1 = 0.1\left(\Delta m, 1-10 - \sum_{i=1}^{10} dm, i\right) \quad (10)$$

By introducing the results of Eq. 7, we obtain $$\Delta m, 1 = 0.1\left(\Delta m-1, 1+dm, 1-10 - \sum_{i=1}^{10} dm, i\right) \quad (11)$$

i.e. the correction of the first stage of the minor decade $m$ can be expressed, according to Eq. 11 by the correction of the first stage of the senior decade $(m-1)$, by the excess of the sum voltage of decade $m$ relative to the voltage of the first stage of decade $(m-1)$ and by the sum of voltage excesses of each of the ten stages of decade $m$ relative to the voltage at its first stage.

Eq. 9 is derived for a case when decade 10 has ten stages. If in the potentiometer circuit a decade $m$ is used with the number of stages $n$ generally not equal to 10, then it is possible to derive the following more general equation:

$$\Delta m, 1-n = n\Delta m, 1 + \sum_{i=1}^{n} dm, i \quad (12)$$

Eq. 12 differs from Eq. 9 only in the number of stages ($n$ instead of 10).

Solving Eq. 12 relative to $\Delta m,1$, we obtain an equation similar to Eq. 10:

$$\Delta m, 1 = \frac{1}{n}\left(\Delta m, 1-n - \sum_{i=1}^{n} dm, i\right) \quad (13)$$

As is known, the adjusting resistor of the potentiometer consists of a basic non-adjustable part serving to balance the constant component of the standard cell E.M.F. and of an additional adjustable part serving to balance small changes in the standard cell E.M.F. caused by the temperature fluctuations. The variable part of the adjusting resistor balances not more than 0.001 of the total E.M.F. of the standard cell. Therefore the variable part of the adjusting resistor can be easily made with small enough errors which can be neglected when calculating the potentiometer corrections. Unlike the variable part, the basic non-adjustable part of the adjusting resistor, balancing not less than 0.999 of the standard cell voltage essentially affects the potentiometer accuracy.

The basic part of the adjusting resistor can be composed of separate resistors or (completely or partially) of the resistors which are included in the measuring decades of the potentiometer. In both cases, to provide self-checking, it is necessary to satisfy the following condition (condition I): the adjusting resistor should be divided with potential taps into sections with such values that the total voltage at the adjusting resistor be divided into parts either equal to each other according to the nominal value, or equal to the voltages at the measuring decades of the potentiometer.

EXAMPLE 1

Let us consider an example of sectioning an adjusting resistor. Let the working current in the adjusting resistor circuit be 1 ma. Then, for balancing the constant component of the standard cell E.M.F. of 1018 mv., it is necessary to provide 1018 ohm for the basic non-adjustable part of the adjusting resistor. Let the circuit of the same current be provided with the resistors 20×10 ohm of decade I having its stage multiplying factor of 10 mv. and the resistor 10×1 ohm of decade II having its stage multiplying factor 1 mv. Then it is reasonable to use the impedance of the decade I as the first section of the adjusting resistor $\Gamma y,1=200$ ohm, add four sections more $(\Gamma y,2 \ldots \Gamma y,5)$ each of 200 ohm, use the sum resistance of decade II as the section $\Gamma y,6=10$ ohm and add one section $\Gamma y,7=8$ ohm more. It will give the required value of the adjusting resistor.

$\Gamma y = \Gamma y,1 + \Gamma y,2 \ldots + \Gamma y,7$
$= 200+200+200+200+200+10+8 = 1018$ ohm According to the above condition (condition I) the voltage at the adjusting resistor is summed from the following voltages:

(1) voltages $Uy,1, Uy,2 \ldots Uy,5$, each voltage by the nominal value (20 mv.) being equal to the nominal value of the sum voltage of decade I:

$$(20 \times 10 \text{ mv.} = 200 \text{ mv.})$$

(2) voltage $Uy,6=10$ mv. equal to the sum voltage of decade II:

$$Uy,6 = U_{2,1} - 10$$

(3) voltage $Uy,7=8$ mv., which by the nominal value is equal to the sum voltage of eight stages of decade II:

$$Uy,7_{\text{nom}} = \sum_{i=1}^{8} U_{2,i_{\text{nom}}}$$

The division of the adjusting resistor into sections can be carried out in a different way. The only important thing is that the sections should have the voltage comparable to the voltages at the resistors of the measuring decades. Then it is possible to reduce the potentiometer checking to measuring small differences between the real voltages at those sections of the potentiometer circuit, where the nominal values of the voltages should be equal to each other.

In order to illustrate it, let us consider still further the foregoing example of the embodiment of the adjusting resistor.

The sum voltage at the adjusting resistor is equal to the sum of the voltages at all its sections:

$$Uy = Uy,1 + Uy,2 + \ldots + Uy,7$$

Therefore, the sum of the voltage corrections at separate sections is equal to the correction of the sum voltage at the adjusting resistor which is always brought to zero by the systematic adjustment of the working current according to the standard cell, satisfying the equation $$Uy = E_N$$

where $E_N$ is the E.M.F. of the standard cell.

Thus we obtain $$\Delta y,1 + \Delta y,2 + \ldots + \Delta y,7 = \Delta y = 0 \quad (14)$$

where $\Delta y,1; \Delta y,2 \ldots \Delta y,7$ are the corrections of voltages at the first, second, seventh sections of the adjusting resistor;

$\Delta y$ is the correction of the sum voltage at the adjusting resistor.

As the rated voltages at the first five sections of the adjusting resistor are equal to the sum voltage $U_{1,1-20}$ at the twenty stages of decade I, the corrections of these sections may be expressed by the correction of the sum voltage of the first decade and by the difference between the real voltages at each section and at the first decade.

$$\begin{aligned}\Delta y,1 &= \Delta 1,1-20+dy,1 \\ \Delta y,2 &= \Delta 1,1-20+dy,2 \\ \Delta y,5 &= \Delta 1,1-20+dy,5\end{aligned} \quad (15)$$

Here $dy,i$ is the excess of the real voltage value at section $i$ of the adjusting resistor relative to the real sum voltage at decade I, i.e.

$$dy,i = Uy,i - \sum_{i=1}^{20} Ul,i \quad (16)$$

In the considered case for the first section we obtain:

$$dy,i = dy,l \equiv 0$$

decade I being employed as the first section of the adjustable resistor, and therefore $$Uy,l \equiv \sum_{i=1}^{20} Ul,l$$

By the same reason the correction at the sixth section of the adjusting resistor equals the correction of the sum voltage at ten stages of decade II:

$$\Delta y, 6 = \Delta 2, 1\text{-}10 \tag{17}$$

According to Eq. 7 we obtain, assuming $m=2$ $$\Delta 2, 1\text{-}10 = d_{2,1\text{-}10} + \Delta_{1,1} \tag{18}$$

According to Eq. 13 we obtain, assuming $m=1$ and $n=20$, $$\Delta_{1,1} = \frac{1}{20}\left(\Delta 1, 1\text{-}20 - \sum_{i=1}^{20} d_{1,i}\right) \tag{19}$$

By introducing the results of Eq. 19 into Eq. 18 and using the obtained result for introducing it into Eq. 17, we obtain $$\Delta_{y,6} = d_{2,1\text{-}10} + \frac{1}{20}\left(\Delta_{1,1\text{-}20} - \sum_{i=1}^{20} d_{1,i}\right) \tag{20}$$

Let us consider the correction to the voltage at the seventh section of the adjusting resistor.

According to the above-stated condition $$U_{y,7_{\text{nom}}} = \sum_{i=1}^{8} U_{2,i_{\text{nom}}} \tag{21}$$

Let us designate the difference between the real voltage at the seventh section and the sum voltage at eight stages of decade II by $dy,7$ $$d_{y,7} = U_{y,7} - \sum_{i=1}^{8} U_{2,i} \tag{22}$$

Let us transform Eq. 22 using Eq. 21:

$$d_{y,7} = (U_{y,7} - U_{y,7_{\text{nom}}}) - \left(\sum_{i=1}^{8} U_{2,i} - \sum_{i=1}^{8} U_{2,i_{\text{nom}}}\right)$$

$$= \Delta_{y,7} - \sum_{i=1}^{8} (U_{2,i} - U_{2,i_{\text{nom}}})$$

or $$d_{y,7} = \Delta_{y,7} - \sum_{i=1}^{8} \Delta_{2,i} \tag{23}$$

According to Eq. 3, we obtain, assuming $m=2$ $$\Delta_{2,1} = d_{2,1} + \Delta_{2,1} \tag{24}$$

By introducing Eq. 24 into Eq. 23, we obtain $$d_{y,7} = \Delta_{y,7} - 8\Delta_{2,1} - \sum_{i=1}^{8} d_{2,i} \tag{25}$$

From Eq. 25, we obtain $$\Delta_{y,7} = d_{y,7} + 8\Delta_{2,1} + \sum_{i=1}^{8} d_{2,i} \tag{26}$$

According to Eq. 11, we obtain, when $m=2$ $$\Delta_{2,1} = 0.1\left(\Delta_{1,1} d_{2,1\text{-}10} - \sum_{i=1}^{10} d_{2,i}\right)$$

By introducing the value $\Delta_{1,1}$ from Eq. 19, we obtain $$\Delta_{2,1} = 0.1\left[\frac{1}{20}\left(\Delta_{1,1\text{-}20} - \sum_{i=1}^{20} d_{1,i}\right) + d_{2,1\text{-}10} - \sum_{i=1}^{10} d_{2,i}\right] \tag{27}$$

By introducing Eq. 27 into Eq. 26, we obtain $$\Delta_{y,7} = d_{y,7} + 8.0.1\left[\frac{1}{20}\left(\Delta_{1,1\text{-}20} - \sum_{i=1}^{20} d_{1,i}\right) + d_{2,1\text{-}10} - \sum_{i=1}^{10} d_{2,i}\right] + \sum_{i=1}^{8} d_{2,i} \tag{28}$$

or $$\Delta_{y,7} = d_{y,7} + 0.04\,\Delta_{1,1\text{-}20} - 0.04\sum_{i=1}^{20} d_{1,i} + 0.8\,d_{2,1\text{-}10} -$$

$$0.8\sum_{i=1}^{20} d_{2,i} + \sum_{i=1}^{8} d_{2,i}$$

Equations 15, 20 and 28 express the corrections to the voltages at all the sections of the adjusting resistor by the correction $\Delta_{1,1\text{-}20}$ of the sum voltage of decade I.

According to Eq. 14 the sum of the voltage corrections at all the sections of the adjusting resistor is always equal to zero during the operation of the potentiometer. By introducing the correction values for all sections according to Eqs. 15, 20 and 28, after some simple transformations we obtain $$5.09\Delta_{1,1\text{-}20} + \sum_{i=1}^{5} d_{y,i} + 1.8 d_{2,1\text{-}10} - 0.09 \sum_{i=1}^{20} d_{1,i} -$$

$$0.8\sum_{i=1}^{10} d_{2,i} + \sum_{i=1}^{8} d_{2,i} + d_{y,7} = 0$$

By solving this equation relative to $_{1,1\text{-}20}$, we obtain $$\Delta_{1,1\text{-}20} = \frac{0.09\sum_{i=1}^{20} d_{1,i} + 0.08\sum_{i=1}^{10} d_{2,i} - \sum_{i=1}^{8} d_{2,i} - \sum_{i=1}^{5} d_{2,i} - 1.8 d_{2,1\text{-}10} - d_{y,7}}{5.09} \tag{29}$$

All the coefficients in Eq. 29 are given with their exact values without approximations and have a quite definite physical meaning. For example, the coefficient 5.09 in the denominator is equal to the ratio of the nominal voltages at the adjusting resistor (1018 mv.) and at decade I (200 mv.)

$$1018 : 200 = 5.09$$

Eq. 29 is very important, as it allows to calculate the correction $\Delta_{1,1\text{-}20}$ of the sum voltage of decade I, knowing only the differences dy,7; dl,i; d2,i; dy,i and d2,1-10 between the real values of the nominally equal voltages at the sections of the potentiometer circuit and without measuring the real values of these voltages.

After calculation of the correction $\Delta_{1,1\text{-}20}$ there is no difficulty to calculate the correction of the first stage of the first decade according to Eq. 19. Then, by using Eqs. 3 and 11 it is possible to calculate the corrections for each stage of each decade of the potentiometer beginning from the senior decades to the minor ones. But for a practical usage it is more convenient to employ not the corrections of separate stages of each decade, but the corrections of the real decade readings which are equal to the sum of the decade stage corrections switched on at the given reading.

Let us introduce the following designations:
Zb is reading on the limb of decade $m$
$\Delta m,i$ is the correction of the stage $i$ of the decade $m$;
$\Delta Zm=k$ is the correction to the reading of decade $m$ when setting it for $Zm=k$.

By using Eq. 3, the correction to the reading of any decade can be expressed by the equation $$\Delta Zm = k = Zm\Delta m, 1 + \sum_{i=1}^{1} d1, i \tag{30}$$

According to Eq. 19 for the first decade $$\Delta_{1,1} = 0.05\left(\Delta_{1,1\text{-}20} - \sum_{i=1}^{20} d1, i\right) \tag{31}$$

where $\Delta_{1,1\text{-}20}$ is calculated in accordance with Eq. 29.
The values m,1 included in Eq. 30 are calculated for all the other decades but the first one in succession according to the equation $$\Delta m, 1 = 0.1\left(\Delta m - 1, 1 + dm, 1 - 10 - \sum_{i=1}^{10} dm, 1\right)$$

(32)

(To derive Eq. 32, see how Eq. 11 is derived.)

Eqs. 29, 30, 31 and 32 allow to calculate the corrections to the readings of any potentiometer decade by using the measurements of only the differences between the voltages at the sections of the adjusting resistor and those at the measuring resistors.

Eqs. 30 and 32 are of a general character and do not depend upon the selection of the stage number in decade I or the selection of the adjustable resistor sections.

Eqs. 29 and 31 are derived for the above-mentioned particular case when decade I is provided with 20 stages and the adjusting resistor is divided into sections having the values given in the example.

By employing the method described above and the example of its application it is easy to derive equations (similar to Eq. 29 for determining $\Delta_{1,1-20}$) and for any other selection of the values of circuit resistors.

Then it is possible to select a special design of the adjusting resistor, or a more complicated case when some resistors in the potentiometer circuit are used both as adjusting resistors and as measuring ones. It is just such a more complicated case which has been considered in the example.

Eq. 31 in its general form was considered before. In case the potentiometer circuit is provided with the first decade with the number of stages $n \neq 20$, it is necessary to employ Eq. 13 instead of Eq. 31 introducing $m=1$ and $n$ corresponding to a number of the decade stages.

It should be noted that the present invention allows to check adjust the potentiometer at its operation site by using only the checked potentiometer itself, bringing the accuracy of this checking to any required value not limited by the accuracy level of other standard potentiometers and testing instruments.

Although the present invention is described in accordance with a specific embodiment and a preferable method of application, it is apparent to those skilled in the art that other modifications and versions can be made without departing from the spirit and scope of the invention.

What is claimed is:

1. Measuring apparatus adapted for connection to a source of voltage, said apparatus comprising balancing means, first and second series of contacts coupled to said balancing means; first, second, third and fourth decades including respective serially connected resistors, taps including a zero tap connected to said resistors and brushes for selectively engaging said taps; third and fourth series of contacts, a selector means including the first through fourth series of contacts and having brushes for selecting contacts from the first and second series and a shorting means for coupling contacts from the third and fourth series; a pair of terminals adapted to be coupled to an unknown source of voltage; a first contact bar engaged by the brush of said first decade and coupled to one of said terminals, the other of said terminals being connected by said selector means to said first series of contacts, a second contact bar engaged by the brush of said second decade and being connected to said third series of contacts, a third contact bar engaged by the brush of said third decade and being connected to said fourth series of contacts, a fourth contact bar engaged by the brush of said fourth decade and being connected by said selector means to said second series of contacts; adjusting means including a standard cell and adjustable resistor connected in a loop, a first current source connected in a loop with said adjustable resistor and said first and second decades; a second adjustable resistor, and a second current source connected in a loop with the latter said resistor and said third and fourth decades, said taps dividing said decades into a plurality of serially connected resistors, adjustable resistance means connected in parallel with at least some of the latter said resistors, the adjustable resistance means each including a fixed and adjustable resistor in series, fifth, sixth, seventh and eighth contact bars corresponding respectively to the first, second, third and fourth contact bars and further brushes paired with the first said brushes and connected to the taps in said decades which are adjacent the taps engaged by the first said brushes.

References Cited

UNITED STATES PATENTS

| | | | |
|---|---|---|---|
| 1,397,228 | 11/1921 | Nyguist | 324—63 |
| 2,095,305 | 10/1937 | Allison | 324—63 |
| 2,497,961 | 2/1950 | Shaw | 324—99 X |
| 2,780,776 | 2/1957 | Goeppinger et al. | 324—63 |
| 2,980,894 | 4/1961 | Lindemann | 324—99 X |
| 3,245,304 | 4/1966 | Davis | 318—20.750 X |
| 2,083,408 | 6/1937 | Stein | 324—63 |
| 2,803,799 | 8/1957 | Siegel et al. | 324—63 |
| 2,930,030 | 3/1960 | Mitsuaki Hirose | 324—99 |
| 3,065,418 | 11/1962 | Dauphinee | 324—98 |
| 3,252,080 | 5/1966 | Newbold et al. | 324—98 X |
| 3,307,104 | 2/1967 | Shirk | 324—62 |

FOREIGN PATENTS 556,376 4/1958 Canada.
726,221 10/1962 Germany.

OTHER REFERENCES

German printed application No. 1,004,282, published Mar. 14, 1957.

RUDOLPH V. ROLINEC, *Primary Examiner.*

E. E. KUBASIEWICZ, *Assistant Examiner.*

U.S. Cl. X.R.

324—63.